March 24, 1970 — M. P. MISKULIN — 3,502,268
AUTOMOTIVE HEATERS
Filed May 7, 1968

INVENTOR
MARTIN P. MISKULIN
BY  Gerald P. Welch
ATTORNEY

United States Patent Office 3,502,268
Patented Mar. 24, 1970

3,502,268
AUTOMOTIVE HEATERS
Martin P. Miskulin, 2563 N. 37th St.,
Milwaukee, Wis. 53210
Filed May 7, 1968, Ser. No. 727,308
Int. Cl. B60h 1/02
U.S. Cl. 237—12.3                           2 Claims

ABSTRACT OF THE DISCLOSURE

An automotive heater assembly interposed between the exhaust manifold and exhaust pipe of an automobile including a central perforated tube in a heat chamber embraced by a sleeve form water jacket connected by a short circuit of tubing to and from the conventional heater of the vehicle and the adjacent insulated storage tank.

---

The present conventional automotive heater utilizes water heated in the jacket surrounding the cylinders of the vehicle engine. In cold weather the engine does not develop heat sufficient to warm up the water in the heater for several minutes, and the present invention avails itself of the high heat derived from the exhaust system of the engine to heat a relatively small amount of water which is directly short-circuited to the car heater, and the insulated storage tank which will keep some of the water warm for a long period of time.

The slowness of heating in the conventional automotive system is due to the relatively large amount of water in the water jackets for the cylinders. In the present invention a small amount of water is subjected to intense heat.

DESCRIPTION OF THE PREFERRED EMBODIMENTS

Figure 1:
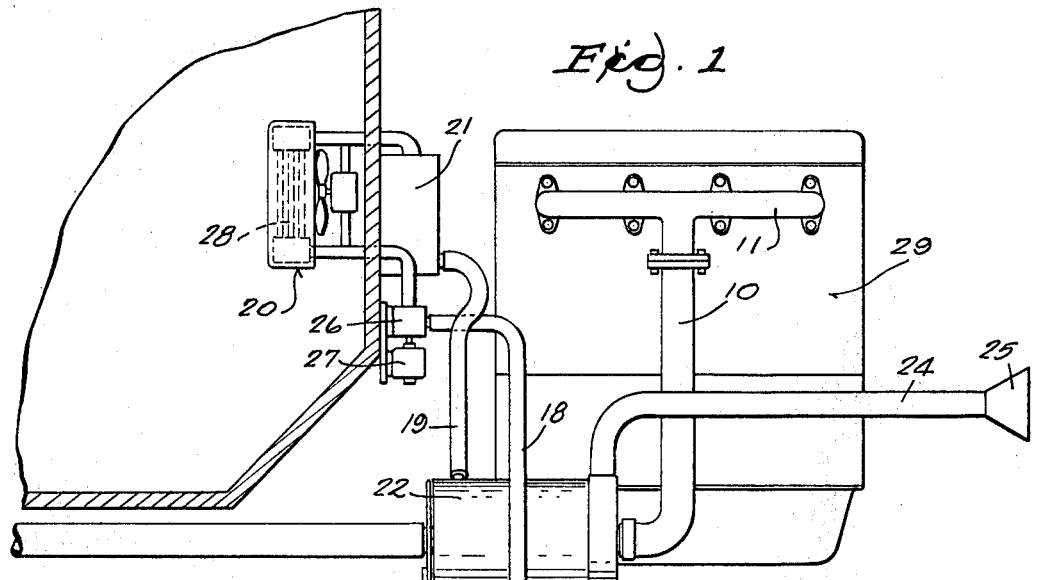
FIG. 1 is a side view in elevation of an automotive heater embodying the invention attached to a vehicle.
Figures 2, 3, 4:
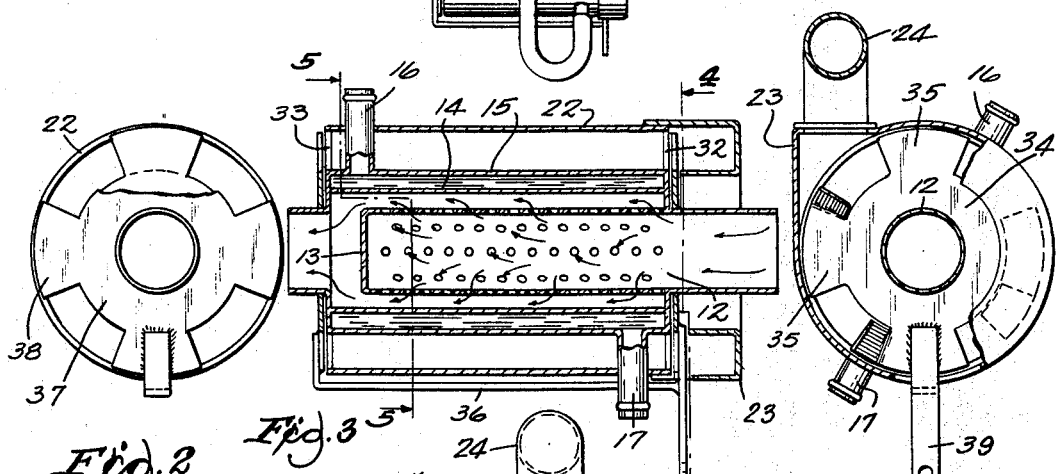
FIG. 2 is a view partly in elevation and partially cut away of one of the rotary port elements.
FIG. 3 is a longitudinal vertical sectional view taken through the exhaust heating device.
FIG. 4 is a view taken on line 4—4 of FIG. 3.
Figure 5:
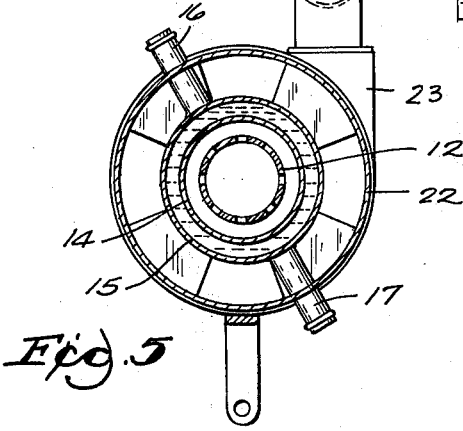
FIG. 5 is a view taken on line 5—5 of FIG. 3.

As shown in FIG. 1, a pipe 10 leads from the exhaust manifold 11 to the perforated tube 12 having the baffle end 13, in the cylindrical casing 14, the latter constituting the inner wall of the water jacket or sleeve 15 having two ports 16 and 17 coupled with hoses 18 and 19 to the car heater 20 and storage insulated tank 21. The outer cylinder 22 has a frontal circular tube square in cross-section 23 coupled with the tube 24 terminating frontally with the funnel 25 for ingress of outside air during movement of the vehicle.

It will be understood that exhaust gases within the perforated tube 12 and baffle end 13 will be forced outwardly through the perforations against the water sleeve element 15 and will quickly heat the water therein, and pump 26 energized by the motor 27 will force the hot water upwardly through the car heater radiator 28. When the car engine 29 is stopped, a quantity of hot water will be held back in the insulated tank 21. After a period of hours this water will still be partly warm, thus speeding up the heating process when the car engine is started.

The elements 15 and 22 define a sleeve air passage, and air received through the funnel 25, tube 24 and element 23 is admitted through ports at 32 into said sleeve air passage, and leaves the latter through the ports at 33. A plate 34 at the intake end has the spaced closures 35, and is connected by the bar 36 with the plate 37 having similar spaced closures 38. A lever 39 attached to plate 34 may be used to simultaneously open or close the ports at 32 and 33. During warm or mild weather it is desirable to permit the outside air to pass through the sleeve air passage to keep the water jacket cool.

It will be understood that the device is capable of many modifications in structure and design, without departing from the spirit of the invention, within the scope of the appended claims.

Having thus described the invention, what is claimed and desired to be secured by Letters Patent of the United States, is:

1. In combination with a conventional hot water automobile heater, a perforated tube connected with a tube leading to the exhaust manifold of an engine, a circular double walled sleeve assembly closely spaced from and embracing said perforated tube, and an outer cylinder embracing the assembly, a pair of rotatable vent closures at each end of said outer cylinder, means for opening and closing the same, and means for leading outside air through said outer cylinder during warm weather to cool said circular double walled sleeve water jacket, and conduit means communicating with both ends of said double walled sleeve and the car heater radiator for the passage of water therethrough.

2. An assembly as in claim 1, and a baffle closed end on said perforated tube to confine and intensify the heat.

References Cited

UNITED STATES PATENTS

| | | | |
|---|---|---|---|
| 1,770,980 | 7/1930 | Gould. | |
| 1,663,903 | 3/1928 | Corbbiere | 165—52 |
| 2,507,113 | 5/1950 | Marshall | 237—7 |
| 2,612,235 | 9/1952 | Schreeck | 165—135 |
| 3,236,044 | 2/1966 | Ruge. | |

EDWARD J. MICHAEL, Primary Examiner